(No Model.)
C. M. SCHAFFER.
VELOCIPEDE.
No. 291,781. Patented Jan. 8, 1884.
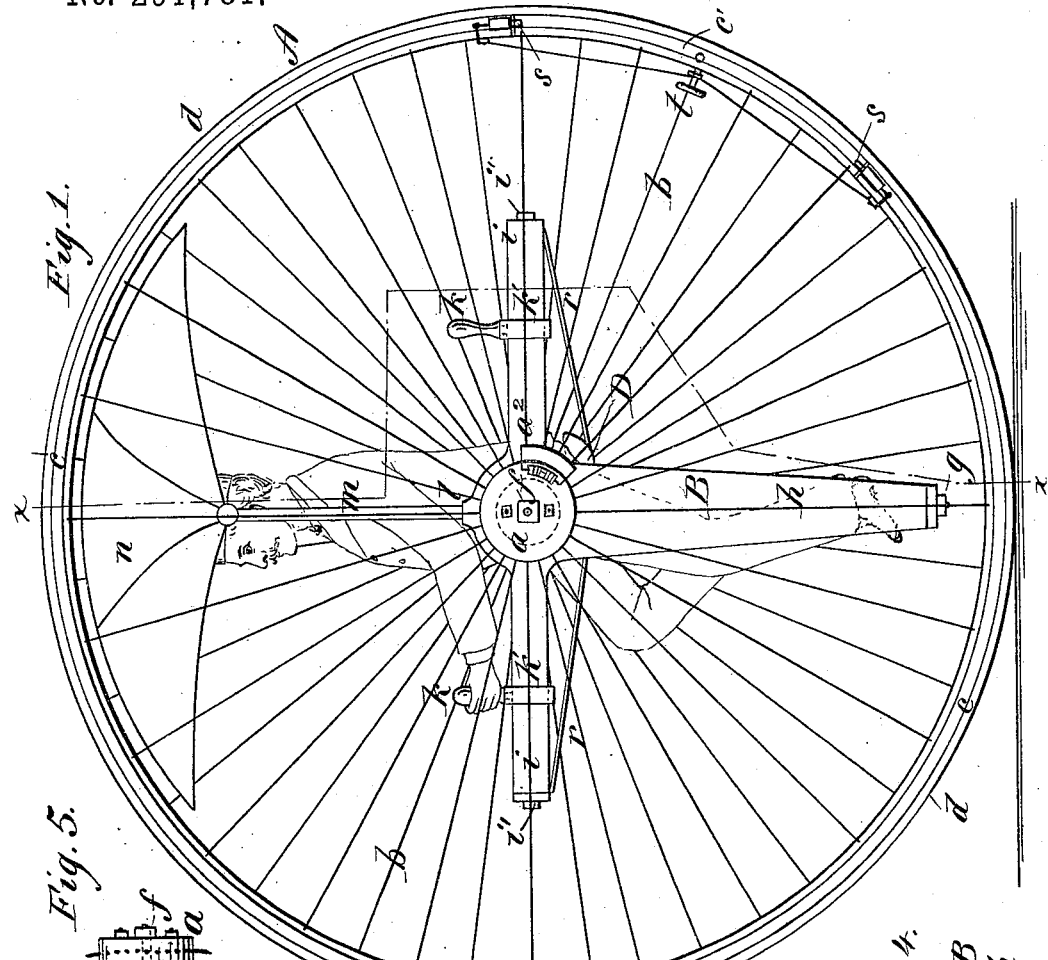
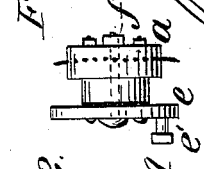
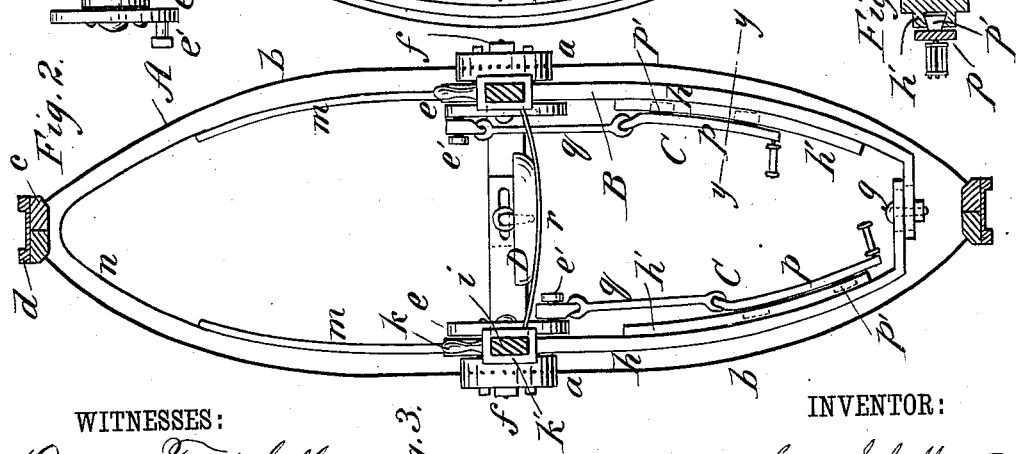
WITNESSES:
Donn Twitchell
C. Sedgwick
INVENTOR:
C. M. Schaffer
BY Munn & Co.
ATTORNEYS.

United States Patent Office.

CHARLES M. SCHAFFER, OF LOUISVILLE, KENTUCKY, ASSIGNOR TO HIMSELF, JAMES T. RITCHIE, CORNELIUS C. ALLEN, AND GEORGE W. ALLEN, ALL OF SAME PLACE.

VELOCIPEDE.

SPECIFICATION forming part of Letters Patent No. 291,781, dated January 8, 1884.

Application filed June 16, 1883. (No model.)

*To all whom it may concern:*

Be it known that I, CHARLES M. SCHAFFER, of Louisville, in the county of Jefferson and State of Kentucky, have invented a new and Improved Unicycle-Velocipede, of which the following is a full, clear, and exact description.

The object of my invention is to furnish a safe and convenient velocipede of the unicycle type; and to that end my invention consists in certain novel features of construction and arrangement, as hereinafter described and claimed.

Reference is to be had to the accompanying drawings, forming a part of this specification, in which similar letters of reference indicate corresponding parts in all the figures.

Figure 1 is a side elevation of my improved machine. Fig. 2 is a transverse section of the same. Fig. 3 is a detail inside view of the rim, showing the removable portion; and Fig. 4 is a detail cross-section on line $x$ $x$, Fig. 2. Fig. 5 is a detail view of the hub.

The wheel A is made double, or with two sides, each consisting of a hub and spokes, $b$, connected to a rim formed of continuous fellies $c$ and tire $d$, so that a space is formed between the two sides for the rider and operator. Preferably the wheel is of such a diameter that the operator may stand erect, and in order to obtain the necessary vertical space without too large a wheel the rim or felly is made of considerable width, as shown in Fig. 2. With this wide tire the wheel will stand without support, and I prefer to use a recessed tire or two smaller tires, as shown, between which is a rubber or elastic band to prevent concussion and noise.

The hubs $a$ are formed in two portions—the hub proper, that receives the spokes, and a disk, $e$, provided with a crank-pin, $e'$. The two parts are connected by a bolt, $f$, and the outer portion, $a$, being turned down smaller, a space is formed for receiving and suspending the saddle-frame B, and the bolt $f$ binding the parts firmly together, the saddle-frame forms a continuation of the axle.

The saddle-frame shown in Fig. 2 may be a single piece or formed in two portions, as shown, each side separate, and the two connected by a bolt, $g$, passing through a slot in their lower flanges, so as to permit adjustment. The vertical portion $h$ at each side is formed with dovetail flanges $h'$, and the arms $i$ $i$, that extend forward and back, are curved inward for connection to the opposite arms by bolts $i'$. On each arm $i$ is a handle, $k$, that screws through an adjustable band, $k'$, into any one of the threaded holes in the arm, so that the reach can be varied to suit the rider. At $l$, on each side of frame B, is fixed a rod, $m$, that supports one side of a canopy, $n$.

C C are the treadles, consisting of a block, $p$, having dovetail lugs $p'$, that engage the flanges $h'$ of the saddle-frame, so as to slide therein, and of a rod, $q$, jointed to block $p$ and connected to the crank-pins $e'$.

D is the saddle or seat suspended from the ends of arms $i$ by rods $r$; or a side saddle may be hung from the side of the frame B.

To allow of entering the machine, a portion, $c'$, of one felly is made separate, and the hub $a$ made with a hinged segment, $a^2$, to which the spokes from the felly-segment $c'$ connect, so that the latter can be swung out. The segment $c'$ is held in place by latches $s$ $s$, connected for simultaneous operation to a hand-wheel, $t$, at the inner side of the continuous felly.

By this construction a light and substantial machine is obtained—one that can be safely and conveniently used for pleasure or for business purposes.

Having thus described my invention, I claim as new and desire to secure by Letters Patent—

1. The saddle-frame B, consisting of portions $h$, formed with flanges $h'$, and curved arms $i$, provided with adjustable handles, substantially as described.

2. The combination, with the wheel A, of the hinged hub-segment $a^2$, felly-segment $c'$, and the connecting-spokes, substantially as shown and described.

3. In a unicycle-velocipede, the swinging or suspended saddle-frame B, having the curved horizontal arms $i$, extending backward and forward of the center axis of the machine, and carrying and adapted to permit the adjustment of the hand-holds $k$ along the frame, in combination with the seat D, supported upon rods $r$, connected to the outer ends of the arms $i$, and extending inward about centrally of the machine, substantially as and for the purpose set forth.

4. The combination, with wheel A, of the separable felly-section $c'$ and the latches $s\ s$, capable of simultaneous operation by a common hand-wheel, $t$, substantially as and for the purpose set forth.

5. The combination, with wheel A, of the hinged hub-segment $a^2$, felly-segment, and latches $s\ s$, connected to and adapted to be operated by the hand-wheel $t$, substantially as and for the purpose set forth.

6. The combination, with the saddle-frame B, having flanged grooved bars $h\ h'$, of the treadle-bars $p$, provided with projections $p'$, adapted to slide in the flanged grooved bars $h\ h'$, said treadle-bars being connected by rods $q$ to the disks $e$ of the wheel-hubs $a$, substantially as and for the purpose set forth.

7. In a unicycle-velocipede, the combination, with wheel having the spokes connected to hubs $a$, secured to inner disks, $e$, by bolts $f$, of the saddle-frame B, with its upper ends hung on the bolts $f$, and having grooved flanges $h'$, and the treadle-bars $p$, having projections $p'$, adapted to slide in said grooved flanges of the swinging frame, said treadle-bars $p$ being connected to the disks $e$ of the wheel, substantially as and for the purpose set forth.

CHARLES M. SCHAFFER.

Witnesses:
JOHN H. BATES,
ALEX. EVANS.